United States Patent
Pappas et al.

(10) Patent No.: US 6,219,389 B1
(45) Date of Patent: Apr. 17, 2001

(54) RECEIVER IMPLEMENTED DECODING METHOD OF SELECTIVELY PROCESSING CHANNEL STATE METRICS TO MINIMIZE POWER CONSUMPTION AND REDUCE COMPUTATIONAL COMPLEXITY

(75) Inventors: Scott J. Pappas, Lake Zurich, IL (US); Richard Young, Weston, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/107,664

(22) Filed: Jun. 30, 1998

(51) Int. Cl.[7] .............................. H03D 1/00; H04L 27/06
(52) U.S. Cl. ........................................................... 375/341
(58) Field of Search .................................... 375/316, 326, 375/324, 328, 340, 341, 265, 365, 262

(56) References Cited

U.S. PATENT DOCUMENTS

| | | | |
|---|---|---|---|
| 4,507,792 | * 3/1985 | Yamakido et al. | 375/249 |
| 5,027,374 | * 6/1991 | Rossman | 375/341 |
| 5,134,635 | * 7/1992 | Hong et al. | 375/341 |
| 5,272,706 | * 12/1993 | Park | 714/795 |
| 5,289,504 | * 2/1994 | Wilson et al. | 375/316 |
| 5,295,142 | * 3/1994 | Hatakeyama | 714/794 |
| 5,363,413 | * 11/1994 | Vos | 375/340 |
| 5,710,784 | * 1/1998 | Kindred et al. | 375/262 |
| 5,928,378 | * 7/1999 | Choi | 714/795 |

* cited by examiner

*Primary Examiner*—Stephen Chin
*Assistant Examiner*—Lenny Jiang
(74) *Attorney, Agent, or Firm*—Steven R. Santema

(57) ABSTRACT

A receiver implemented decoding of selectively processing channel state metrics to minimize power consumption and reduce computational complexity. The method involves disabling a channel state (signal strength) computation algorithm during decoding of information received on the control channel of a trunked communication system during static conditions. Because the bulk of a radio's power is consumed while in standby mode listening to data information transmitted over a control channel, and because control channel information is typically received while in a good channel quality environment, significant power consumption reduction is realized by disabling the channel state computation algorithm. When a poor quality channel condition is detected, such as may occur when a message error rate (MER) is above the MER quality threshold set for that radio, the radio will enable the channel state computation algorithm.

19 Claims, 1 Drawing Sheet

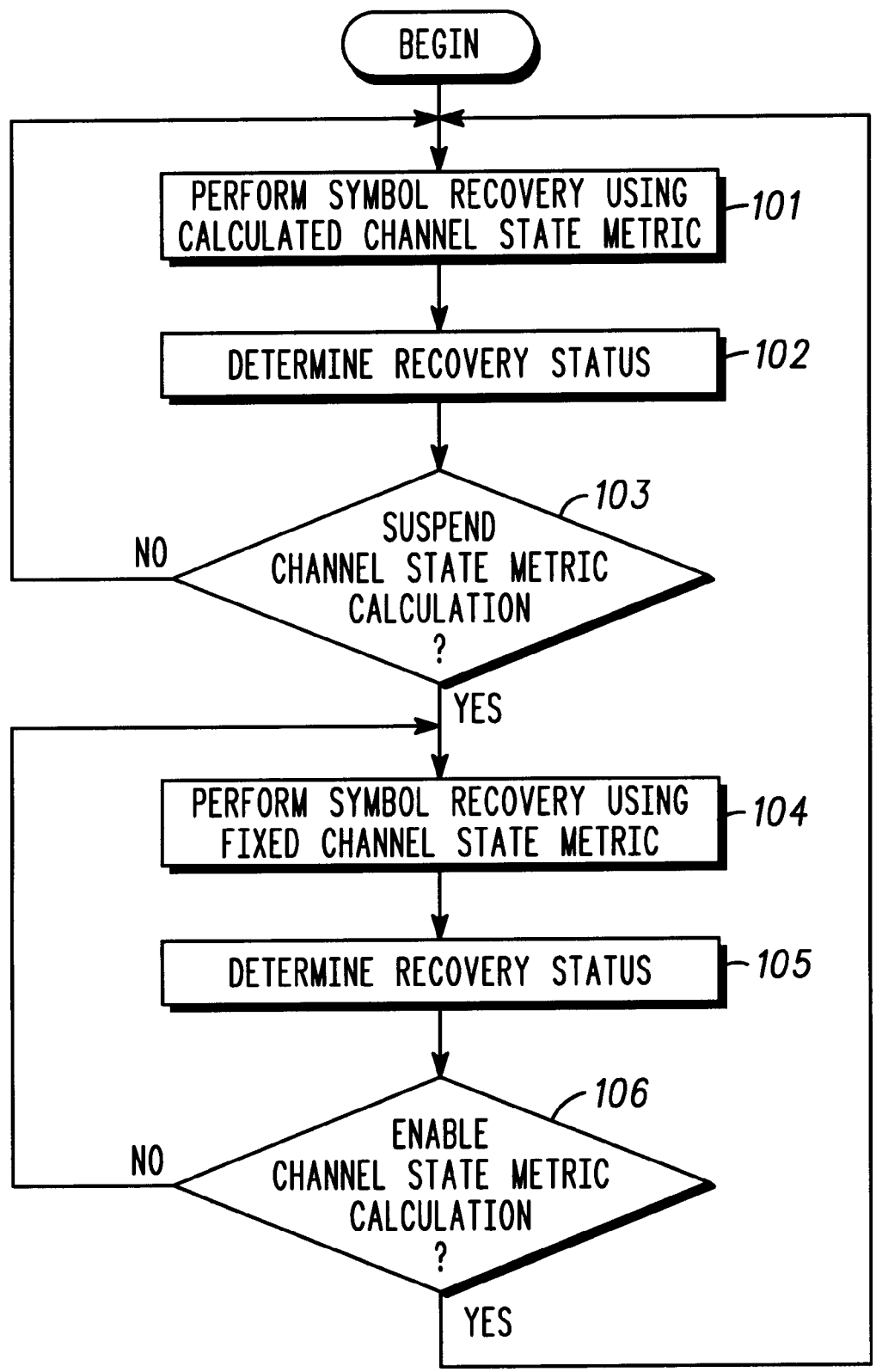

RECEIVER IMPLEMENTED DECODING METHOD OF SELECTIVELY PROCESSING CHANNEL STATE METRICS TO MINIMIZE POWER CONSUMPTION AND REDUCE COMPUTATIONAL COMPLEXITY

FIELD OF THE INVENTION

The present invention relates generally to electronic communications, including but not limited to signal decoding methodologies.

BACKGROUND OF THE INVENTION

Communication systems are known in the art. Many such systems support transmission of data from one location to another. This data will often comprise electronic symbols (such as a symbol having a particular amplitude and/or phase with respect to a baseline metric) that represent particular data quantities or values. Such symbols, when properly received, can be decoded to allow reconstruction of the original message.

Radio frequency communication systems are also known, where such data is transmitted using a radio frequency channel. In a land mobile operating environment, where the sending and receiving unit are moving with respect to one another, channel degradation occurs due to such phenomena as multipath interference, or Rayleigh fading. Such degradation can impact symbol recognition and hence the decoding process, leading to an inaccurate interpretation of the data.

Various methods have been proposed to protect data from channel degradation. Such solutions typically represent a compromise of one sort or the other, and hence have one or more problems associated with their adoption, including costly reception platforms to support computationally intensive recovery schemes, and data throughput reduction (as necessitated, for example, by inclusion of significant error coding or signal diversity of one type or another). These solutions may also suffer from varying standards of reliability as channel conditions vary, as may occur in a short-term faded environment, as when a radio unit temporarily travels through a tunnel.

In U.S. Pat. No. 5,289,504 to Wilson et al, commonly assigned to the assignee of the instant application and incorporated herein by reference, there is disclosed a decoding methodology that addresses at least some of the prior art concerns. In particular, Wilson et al. disclose a method whereby a receiver, in addition to receiving a carrier signal and demodulating it to provide a received information signal, the receiver also processes the carrier signal to determine appropriate channel state metrics. The received information signal and the corresponding calculated channel state metric are both utilized in a disclosed decoding algorithm to recover the original information signal. In the preferred embodiment, the decoding algorithm comprises a Viterbi Algorithm configured to implement a decoder for Trellis Coded Modulation. The carrier signal is processed to calculate the channel state metric information, which information may also be subject to a normalizing step in an effort to potentially minimize subsequent computational requirements. The channel state metric information can also be compensated to accommodate fixed delays that occur in the reception process with respect to determination of the received information signal, and/or may also be subjected to morphological erosion to ensure conservative use of the channel state metric information by the decoding algorithm.

Notable is that Wilson et al explain that the decode processing algorithm may include fixing the channel state metric information output to the decoder at a fixed metric in response to detecting a predetermined channel condition, such as a lack of a faded carrier signal over at least a predetermined period of time. By fixing the channel state metric information during decoding of a signal on a presently static (non-fading) communication channel, Wilson et al is thus able to eliminate error that may occasionally be introduced into a channel state metric calculation by the presence of ordinary channel noise.

As explained in detail in the Wilson patent, decoding of trellis codes or the like symbols transmitted over a carrier signal involves the receiving unit processing the carrier signal to identify the particular amplitude (channel state metric information representative of signal strength) and phase (recovered symbol) information with which reconstruction of the original message could then occur.

All the prior art decoding techniques, including Wilson et al, continue to be highly computationally complex and thus result on substantial battery power consumption. Accordingly, there is a need for an improved decoding solution that results in reduced power consumption and/or computational complexity.

BRIEF DESCRIPTION OF THE DRAWINGS

FIG. 1 illustrates an operational flow diagram of the methodology of the present invention.

DETAILED DESCRIPTION OF THE PREFERRED EMBODIMENTS

Prior art trellis code decoding algorithms for radio communication systems, and particularly for trunked radio communication systems, do not distinguish between decoding of pure data information signals, such as normally may appear on a trunked system control channel and pure voice information signals on a voice channel. It is generally the case in a land mobile radio environment that the received signal will suffer some sort of degradation in amplitude or phase that will affect the ability of the receiver to accurately decode information. These degradations are caused by many different factors such as multipath interference, Rayleigh fading, and low signal strength due to proximity to the transmitting source.

The details about the degradations are not important and are well known in the art. It will suffice to say that conditions exist that will degrade the received signal to the point at which we would call the channel quality "poor", and in the absence of said conditions, we would call the channel "good". Particularly as relates to data (versus voice) type transmissions, applicants have discovered that calculating a signal strength (channel state metric) parameter during decoding, in a communications channel determined to be of good quality, does not aid in signal reconstruction. Thus it follows that during good quality channel conditions, signal strength calculation could be eliminated thus reducing computational complexity of the decoding algorithm. In doing this, Applicants have discovered that when disabling the channel state computation algorithm and, by association, the dedicated circuitry that drives this algorithm, significant power consumption benefits are realized.

The system topology benefiting the most from the invention is a trunked communication system (substantially as shown in the Wilson et al patent for example) or any other system such as digital cellular utilizing a subscriber receiving control channel information. While there are other system configurations that the invention will still apply such as a conventional data system, the benefits may or may not be as great because of the particulars of the system topology.

In a preferred embodiment, the receiver is in standby mode receiving information on the control channel. The channel state computation algorithm will be disabled when in good channel quality conditions. Because the bulk of a radio's power is consumed while in standby mode listening to data information transmitted over a control channel, and because control channel information is typically received while in a good channel quality environment, significant power consumption reduction is realized by disabling the channel state consumption algorithm in standby mode. When a poor channel quality condition is detected, such as may occur when a quality metric degrades below quality threshold set for that radio, the radio will enable the channel state computation algorithm. Because data transmitted on the control channel is typically periodically repeated, no critical data is lost.

In an alternative embodiment, non-critical packet data transmitted over a voice channel in a static environment may also be recovered without channel state metric computation, in the same way as in the control channel implementation described above. Of course, critical voice channel data (i.e., packet data requiring re-transmission from the transmitting unit) can also utilize the benefits of the present invention, but may require retransmission of missed non-periodically repeated data.

The methodology of the present invention will now be described in connection with operational flow diagram (data recovery routine 100) shown in FIG. 1.

In the preferred exemplary embodiment, a portable subscriber radio or the like receiving communication unit operable for example with the Motorola ASTRO® radio operating in an APCO Project 25 Trunked communication system, and employing a trellis decoder (not shown) therein is configured to demodulate a data signal modulated by a transmitting unit (not shown) on a carrier signal and transmitted through a common channel. The decoder is programmed as will be explained below. The transmission and demodulation of data signals over a carrier signal is well known in the art and forms no part of this invention. The invention resides merely in the data recovery routine 100 shown in FIG. 1 for disabling and enabling a channel state metric computation algorithm to minimize power consumption and reduce computational complexity.

For illustrative purposes, it will be presumed that the radio is initially in standby mode monitoring data signals received over the trunked control channel of the radio communication system (101). Assuming the radio decoder begins in the channel state metric calculation mode (101), the channel state metric is calculated using received signal strength and fed into the trellis decoder to aid in recovering the received symbols.

The decoder will remain in this mode until some predetermined recovery conditions are met (102), including but not limited to the signal strength, average message error rate (MER) and temporal state of these measures. Based upon the recovery status the decoder determines if it should remain in the channel state metric calculation mode (103) or if the channel is of sufficient quality to switch to the fixed channel state metric mode.

Once triggered, the decoder enters the fixed channel state metric mode (104). In this mode a fixed channel state metric is fed to the trellis decoder to perform the symbol recovery. In the fixed channel state metric mode the channel state metric is no longer calculated, thus reducing the receiver processing requirements and therefore current drain. In addition the receiver will be configured to no longer provide the information which is fed into the channel state metric calculation which will further reduce the receiver current drain.

While in this mode the recovery status is monitored (105) for predetermined conditions which indicate that the channel quality has degraded to a point where the channel state metric calculation is needed to insure sufficient performance of the trellis decoder. This information is used to determine if the decoder should enable the channel state metric calculation (106). If so the receiver returns to the channel state metric calculation mode (101).

It should be appreciated that in the illustrative example, the decoder is a trellis decoder and the recovered symbols (discrete elements) are recovered trellis symbols. It is therefore possible to use a trellis coded Viterbi type algorithm, as is well known, to process the reconstructed data signals. However, it should also be recognized that the present invention is useful with non-trellis type encoded symbols or the like discrete elements that utilize two pieces of information for the decoding process one of which is only necessary in good channel quality conditions.

The invention is useful in a trunked radio system to decode data on the trunked control channel or a voice channel. In standby mode, subscriber radios typically always decode data being received on the trunked control channel, which depletes power. Reducing power depletion by implementation of the present invention increases battery life. It is also possible to implement the invention to do packet data reception over a voice channel or other system configurations in a radio system.

The present invention is based on the recognition that channel state (signal strength) metrics in good quality signal conditions are not as important when decoding recovered trellis symbols. The approach of disabling the circuitry that processes channel state metrics for such symbols to arrive at the reconstructed original message on the basis of only the recovered symbols (corresponding to the phase of the trellis symbols), is counterintuitive to decoder basic operation, and adds an additional level of complexity to the decoding process not contemplated by the architects of the trellis decoder.

While the present invention has been particularly shown and described with reference to particular embodiments thereof, it will be understood by those skilled in the art that various changes in form and details may be made therein without departing from the spirit and scope of the present invention.

We claim:

1. In a receiving communication unit including a decoder for demodulating a data signal modulated by a transmitting unit on a carrier signal and transmitted through a common channel, a method of selectively processing the carrier signal for channel state information to minimize power consumption and reduce computational complexity, comprising the steps of:

receiving the carrier signal;

processing the carrier signal to generate recovered discrete elements;

identifying channel condition and, when the channel condition is identified as being of good quality, selecting a fixed channel state operational mode providing a fixed channel state metric to the decoder and, while in the fixed channel state operational mode, disabling the processing of the carrier signal for channel state information, and when the channel condition is identified as being poor quality, selecting a channel state metric calculation mode processing the carrier signal to calculate an associated channel state metric for each recovered discrete element, in a manner whereby each calculated channel state metric corresponds temporally to the associated recovered discrete element; and combining with each corresponding recovered discrete element, on the basis of a present operational mode, either the fixed channel state metric or the calculated channel state metric, to recover the data signal.

2. The method of claim 1, wherein said common channel is a control channel and said data signal is a non-voice, packet data signal.

3. The method of claim 1, wherein said common channel is a voice channel and said data signal is a non-voice, packet data signal.

4. The method of claim 1, wherein said common channel is a trunked radio system communication channel.

5. The method of claim 1, wherein said common channel is a cellular radio communications channel.

6. The method of claim 1, wherein the receiving unit is initially set to channel state metric calculation mode by default and the step of selecting a fixed channel state operational mode involves the decoder step of sensing that the channel quality is sufficiently good.

7. The method of claim 6, wherein the step of selecting a channel state metric calculation mode in response to sensing that the channel quality is poor, is maintained until a predetermined condition occurs, after which the decoder is caused to revert to the fixed channel state operational mode.

8. The method of claim 7, wherein said predetermined condition involves waiting for a predetermined period to lapse.

9. The method of claim 7, wherein said predetermined condition involves comparing the channel quality to a threshold to determine if it is good or poor and changing to the fixed channel state operational mode when the channel quality is substantially equal to the poor threshold.

10. The method of claim 7, wherein the step of processing the carrier signal to calculate an associated channel state metric for each recovered discrete element, involves enabling a channel state computation algorithm.

11. The method of claim 10, wherein the decoder is a trellis decoder and the recovered discrete elements are recovered trellis symbols.

12. The method of claim 11, wherein the step of combining is processed by a trellis coded Viterbi type algorithm.

13. The method of claim 11, wherein the decoder is a symbol type decoder and the recovered discrete elements are recovered symbols.

14. The method of claim 11, wherein the decoder utilizes channel signal strength indications that may be disabled when in a good signal quality environment without adversely affecting the decoding process.

15. The method of claim 11, wherein said step of identifying a channel condition involves determining the channel quality.

16. The method of claim 1, wherein the step of processing the carrier signal to calculate an associated channel state metric for each recovered discrete element, involves enabling a channel state computation algorithm.

17. The method of claim 1, wherein the decoder is a trellis decoder and the recovered discrete elements are recovered trellis symbols.

18. The method of claim 1, wherein the step of combining is processed by a trellis coded Viterbi type algorithm.

19. The method of claim 1, wherein the decoder is a symbol type decoder and the recovered discrete elements are recovered symbols.

* * * * *